US009838273B2

(12) United States Patent
Htay et al.

(10) Patent No.: US 9,838,273 B2
(45) Date of Patent: Dec. 5, 2017

(54) METHOD AND APPARATUS FOR MONETIZING A CARRIER NETWORK

(71) Applicant: Ciena Corporation, Hanover, MD (US)

(72) Inventors: Aung Htay, Alpharetta, GA (US); Mallikarjunappa Kore, Alpharetta, GA (US); Cheol Woo Jung, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 497 days.

(21) Appl. No.: 14/019,407

(22) Filed: Sep. 5, 2013

(65) Prior Publication Data
US 2015/0063800 A1 Mar. 5, 2015

(51) Int. Cl.
*H04L 12/24* (2006.01)
*H04Q 11/00* (2006.01)
*H04J 14/02* (2006.01)

(52) U.S. Cl.
CPC ...... *H04L 41/5029* (2013.01); *H04J 14/0257* (2013.01); *H04Q 11/0066* (2013.01); *H04L 41/145* (2013.01); *H04Q 2011/0079* (2013.01); *H04Q 2011/0086* (2013.01)

(58) Field of Classification Search
CPC ....................................................... H04L 12/24
USPC ....................................................... 705/7.11
See application file for complete search history.

(56) References Cited

U.S. PATENT DOCUMENTS

| | | | | |
|---|---|---|---|---|
| 2003/0025964 | A1* | 2/2003 | Herz et al. | 359/124 |
| 2003/0046127 | A1* | 3/2003 | Crowe | G06Q 20/108 705/35 |
| 2004/0114924 | A1* | 6/2004 | Holness et al. | 398/33 |
| 2005/0089027 | A1* | 4/2005 | Colton | 370/380 |
| 2006/0031312 | A1* | 2/2006 | Ellanti | H04L 41/046 709/206 |
| 2006/0127091 | A1* | 6/2006 | Yoo et al. | 398/69 |
| 2006/0182000 | A1* | 8/2006 | McNiece | 369/112.1 |
| 2007/0031148 | A1* | 2/2007 | Ll et al. | 398/79 |
| 2008/0219268 | A1* | 9/2008 | Dennison | H04L 12/4625 370/395.2 |
| 2009/0317073 | A1* | 12/2009 | Hotchkiss | H04L 41/08 398/1 |
| 2010/0215361 | A1* | 8/2010 | Ansari et al. | 398/25 |
| 2011/0039518 | A1* | 2/2011 | Maria | H04L 12/66 455/406 |
| 2013/0259465 | A1* | 10/2013 | Blair | 398/2 |

* cited by examiner

*Primary Examiner* — Kurtis Gills
(74) *Attorney, Agent, or Firm* — Clements Bernard Walker PLLC; Christopher L. Bernard; Lawrence A. Baratta, Jr.

(57) ABSTRACT

Methods and apparatus for monetizing a carrier network are provided. In an example, a wavelength service is captured from deployed network assets in a carrier network. A revenue factor (R), a capital expenditure factor (C), an operational expenditure factor (O), and a service level agreement factor (S) are selected from an analytic profile of the carrier network based on the wavelength service requirements. The R, C, O, and S factors are hexadecimal numbers, and can be weighted relative to each other. An index is calculated by concatenating the R, C, O, and S factors a prioritized order and converting the resultant hexadecimal number into a decimal number. The calculated index is assigned to the wavelength service. The index can be displayed, along with indices for other wavelengths on other paths, to a user in a graphical form.

16 Claims, 12 Drawing Sheets

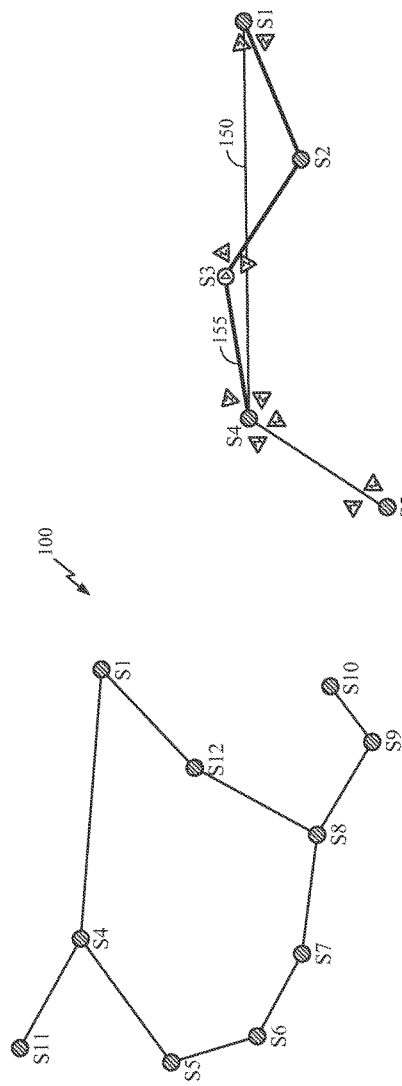
FIG. 1A
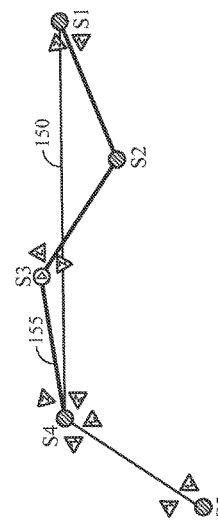
FIG. 1B
| Och Pair | Och Pair Status | Och ID | Och Status | Receiver OSNR Margin (dB) | Verification Path | Source Site | Destination Site | Wavelength (nm) | Distance (km) | Fiber Latency (μs) | OTS Count |
|---|---|---|---|---|---|---|---|---|---|---|---|
| CP1;CP2 | Passed | CP1 | Passed | | VP1 | S1 | S4 | (45)1547.72 | 100.26 | 530 | 2 |
| CP1;CP2 | Passed | CP2 | Passed | | VP2 | S4 | S1 | (45)1547.72 | 100.26 | 530 | 2 |
| CP3;CP4 | Passed | CP3 | Passed | | VP1 | S1 | S4 | (47)1548.51 | 108.26 | 530 | 2 |
FIG. 1C

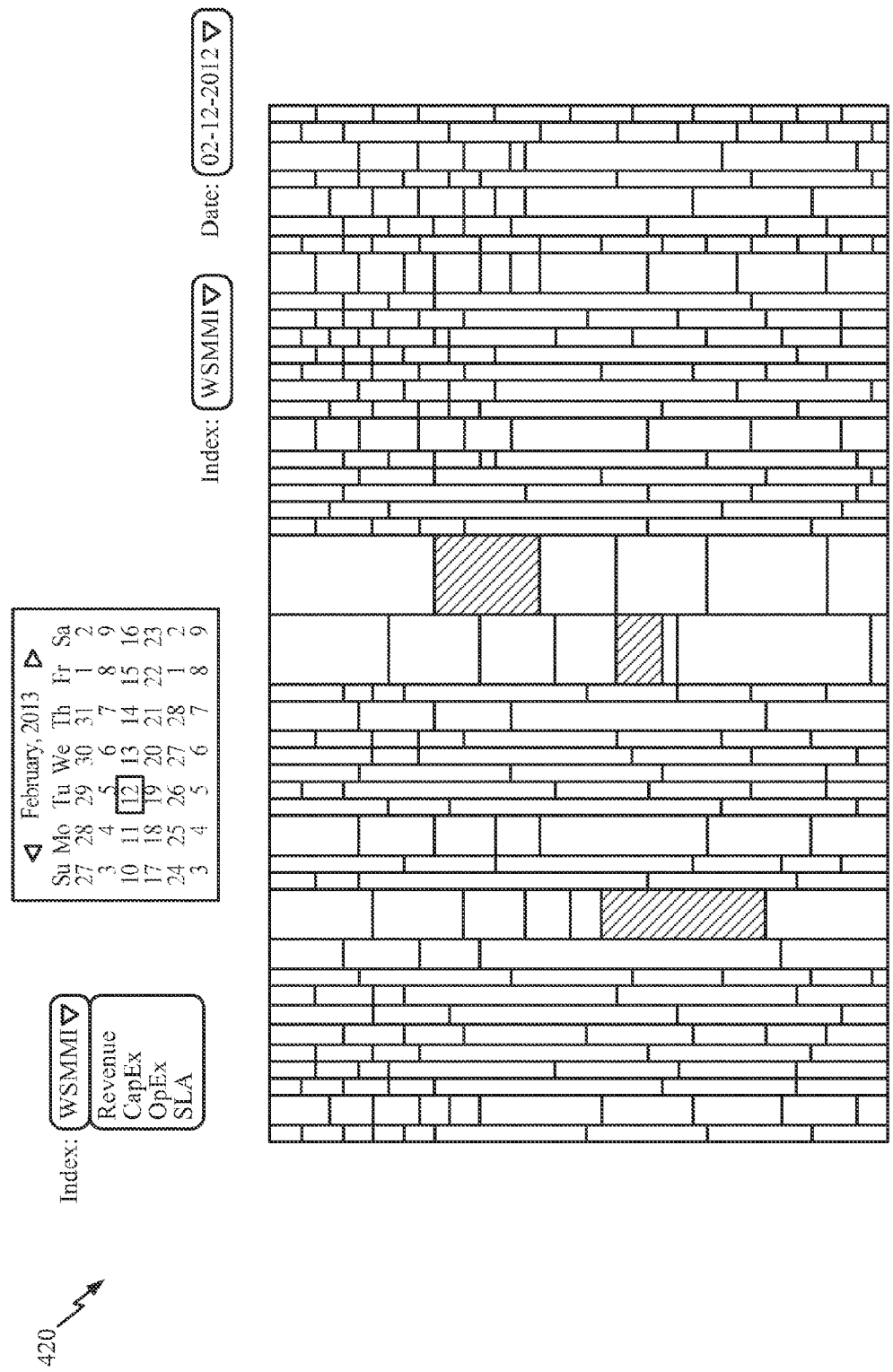

| Verification Path ID | Source Site | Destination Site | Distance [km] | Fiber Latency [μs] |
|---|---|---|---|---|
| VP1 | S1 | S4 | 108.26 | 530 |
| VP5 | S4 | S5 | 87.00 | 426 |
| VP27 | S5 | S6 | 66.00 | 323 |
| VP51 | S5 | S7 | 86.00 | 421 |
| VP53 | S6 | S7 | 20.00 | 98 |

METHOD AND APPARATUS FOR MONETIZING A CARRIER NETWORK

FIELD OF DISCLOSURE

This disclosure relates generally to electronics, and more specifically, but not exclusively, to methods and apparatus for monetizing a carrier network.

BACKGROUND

Global organizations that transport data for others (i.e., "carriers") face tremendous traffic growth. The carriers need to both serve those who use the carrier's services (i.e., "end users") and to be profitable. End users include providers and consumers of over-the-top (OTT) content. OTT content is data transported from a third party to an end user via a carrier. The carrier does not control the contents of the data being transported from the third party to the end user, and essentially only provides a "dumb pipe" to transport the data. In recent years, the new trend of delivering broadband audio, broadband video, VoIP, social networking, games, and ecommerce from the third parties to the end users (i.e., the OTT flood) pushes capacity limits of carriers' conventional data transport networks. Servicing this increase in demand exponentially increases the carriers' costs, while providing essentially no increase in revenue. Further, the carriers are competing with OTT data providers as providers of data, and do not want the position of the "dumb pipe." From a business perspective, servicing OTT content using conventional methods and apparatus leads carriers to financial ruin.

There is a need to address the exploding traffic growth by converging the carriers' packet and optical networks, as well as simplifying these networks. The carriers also have to evolve their current processes (e.g., planning, inventory, provisioning, and maintenance) to take advantage of built-in intelligence in the control plane. There is also a need to manage colorless and/or directionless equipment (e.g., agile photonics) more flexibly than by using a conventional fixed add/drop system.

As depicted in FIG. 1A, a network 100 is conventionally viewed as topological connections between sites (e.g., sites 1, S4-S12). Wavelength services provided by the network 100 are viewed one at a time, as depicted in FIG. 1B. In FIG. 1B, an exemplary wavelength service 150 between S1 and S4 is depicted. The wavelength service 150 is routed 155 through sites S1, S2, S3, and S4, as shown. The properties of the wavelength service 150 are usually shown as a row in a table 160, as depicted in FIG. 1C.

In the example depicted in FIG. 1D, a conventional, limited form of visualization 170 is provided to assist wavelength defragmentation efforts. In FIG. 1D, the x-axis presents a subset of network topology and y-axis represents the optical spectrum. Conventionally, there is no way to view an entire network having a meshed architecture.

Conventional defragmentation might move the services 180 as shown in FIG. 1E. But, in using the technique of FIG. 1E, there is no indication of why these particular services should be the ones that are moved.

Unfortunately, existing service routes are difficult to remap with traditional methods, leaving sub-optimal routed paths. Moreover, constantly provisioning and de-provisioning routes while a network is in use leads to wavelength fragmentation. In carrier networks, with different wavelength services provisioned, it is difficult to determine how and where a specific wavelength service is used and also which wavelengths are available for potential services. This can lead to lost revenue when data cannot be transported because of wavelength fragmentation.

Moreover, conventional techniques do not visually present wavelength usage (e.g., a status of all of the available wavelengths on all paths) in a convenient manner. Conventional techniques also do not proactively monetize fragmented wavelengths, do not provide a way to determine which wavelength to defragment, and do not determine a best time to defragment.

Carriers have a need to improve utilization of existing network assets across both packet and optical transport layers. There is a need for an efficient way to perform analytics on the carriers' planned and existing network, to plan how best to use these networks, and to optimize the return on investment in these networks.

Accordingly, there are long-felt industry needs for methods and apparatus that improve upon conventional methods and apparatus, including a method and apparatus for monetizing a carrier network.

SUMMARY

This summary provides a basic understanding of some aspects of the present teachings. This summary is not exhaustive in detail, and is neither intended to identify all critical features, nor intended to limit the scope of the claims.

Exemplary methods and apparatus for monetizing a carrier network are provided. An exemplary method includes receiving data describing a wavelength service from deployed network assets and selecting a revenue factor (R), a capital expenditure factor (C), an operational expenditure factor (O), and a service level agreement factor (S) from an equipment profile of network equipment in the carrier network based on the data. A default analytic profile can be used in the selecting the R, C, O, and S factors. The R, C, O, and S are hexadecimal numbers. An index is calculated by concatenating R, C, O, and S in a prioritized order and converting the hexadecimal number into a decimal number. At least one of R, C, O, and S can be relatively weighted prior to performing the calculating. The index is assigned to the wavelength service. The index can be displayed to a user in a graphical form.

In a further example, provided is a non-transitory computer-readable medium, comprising instructions stored thereon that, if executed by a processor, cause the processor to execute at least a part of the aforementioned method. The non-transitory computer-readable medium can be integrated with a device, such as a communications device, a network management device, and/or a computer.

In another example, provided is an apparatus configured to monetize a carrier network. The apparatus includes means for receiving data describing a wavelength service from deployed network assets and means for selecting a revenue factor (R), a capital expenditure factor (C), an operational expenditure factor (O), and a service level agreement factor (S) from an equipment profile of network equipment in the carrier network based on the data. The R, C, O, and S are hexadecimal numbers. The apparatus also includes means for calculating an index by concatenating R, C, O, and S in a prioritized order and converting the hexadecimal number into a decimal number, as well as means for assigning the index to the wavelength service. The apparatus can also include means for relatively weighting at least one of R, C, O, and S prior to performing the calculating; means for using a default analytic profile in the selecting the R, C, O, and S factors; and/or means for displaying the index to a user in a graphical form.

At least a part of the apparatus can be integrated on a semiconductor die. Further, at least a part of the apparatus can be integrated with a device, such as a communications device, a network management device, and/or a computer. In a further example, provided is a non-transitory computer-readable medium, comprising instructions stored thereon that, if executed by a lithographic device, cause the lithographic device to fabricate at least a part of the apparatus.

In another example, provided is an apparatus configured to monetize a carrier network. The apparatus includes a processor configured to receive data describing a wavelength service from deployed network assets and configured to select a revenue factor (R), a capital expenditure factor (C), an operational expenditure factor (O), and a service level agreement factor (S) from an equipment profile of network equipment in the carrier network based on the data. The R, C, O, and S are hexadecimal numbers. The processor is also configured to calculate an index by concatenating R, C, O, and S in a prioritized order and converting the hexadecimal number into a decimal number, and configured to assign the index to the wavelength service. The processor can be further configured to relatively weight at least one of R, C, O, and S prior to performing the calculating; configured to use a default analytic profile in the selecting the R, C, O, and S factors; and/or configured to display the index to a user in a graphical form.

At least a part of the apparatus can be integrated on a semiconductor die. Further, at least a part of the apparatus can be integrated with a device, such as a communications device, a network management device, and/or a computer. In a further example, provided is a non-transitory computer-readable medium, comprising instructions stored thereon that, if executed by a lithographic device, cause the lithographic device to fabricate at least a part of the apparatus.

The foregoing broadly outlines some of the features and technical advantages of the present teachings in order that the detailed description and drawings can be better understood. Additional features and advantages are also described in the detailed description. The conception and disclosed embodiments can be readily utilized as a basis for modifying or designing other structures for carrying out the same purposes of the present teachings. Such equivalent constructions do not depart from the technology of the teachings as set forth in the claims. The novel features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The accompanying drawings are presented to describe examples of the present teachings, and are not limiting.

FIGS. 1A-1E depict conventional network management techniques.

FIGS. 4A-4G depict detailed aspects of the method of FIG. 3.

Figure 1D:
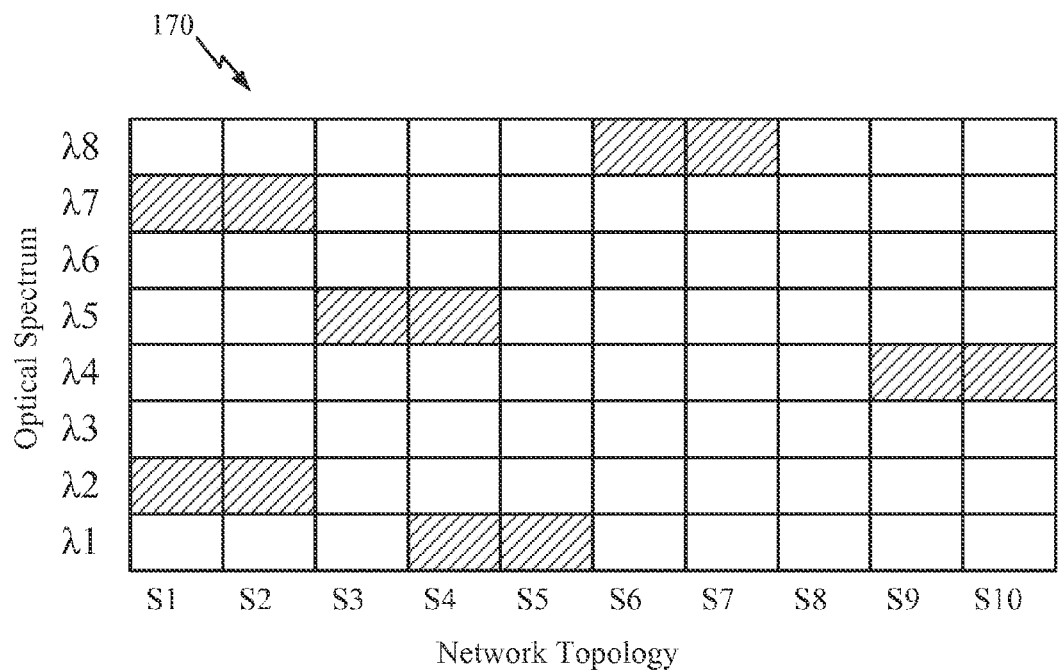
Figure 1E:
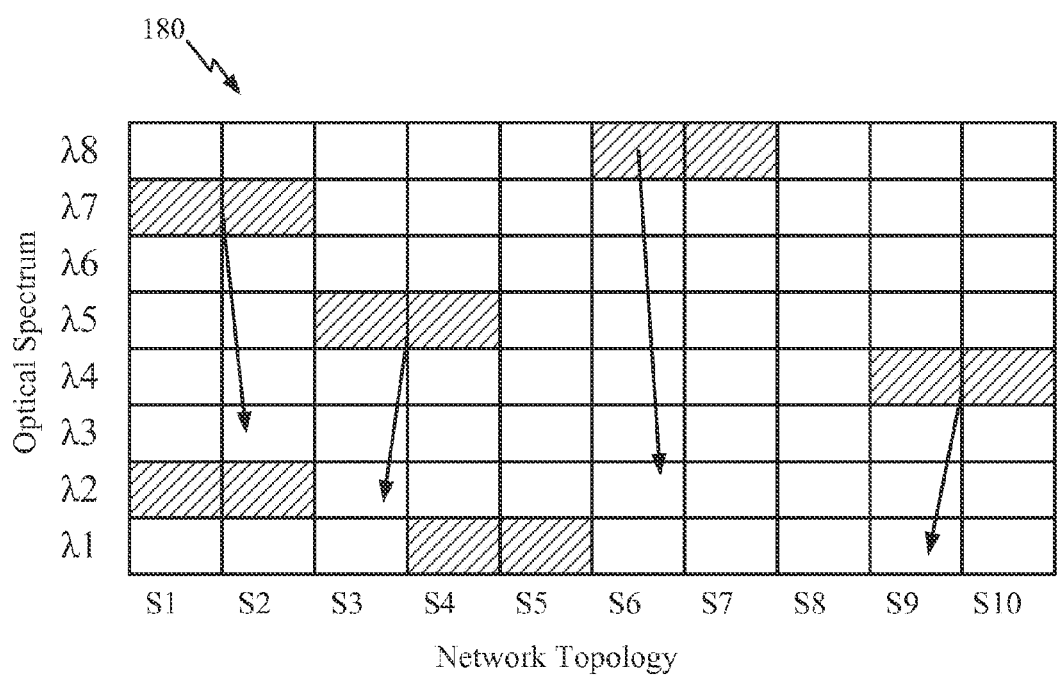

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Introduction

Methods and apparatus for monetizing a carrier network are provided. For example, provided is a Wavelength Service Measurement and Monetization Index (WSMMI). The WSMMI (also referred to herein as "the index") measures relative importance and monetization ability of a wavelength service. The WSMMI enables carriers to perform an "apples-to-apples" comparison on wavelength services in the carrier's network so the carrier can make an informed decision about selecting specific wavelength services and effective usage of bandwidth in the carrier's network. The WSMMI allows the carrier to assign a monetization ability index to the existing services, and to answer questions such as which specific wavelengths and paths to assign to a wavelength service. The index is calculated with relative values for Revenue (R) generated by a given wavelength service, Capital Expenditure (CapEx, also abbreviated as "C") incurred for the given wavelength service, Operational Expenditure (OpEx also abbreviated as "O") for running the given wavelength service, and Service Level Agreement (SLA, also abbreviated as "S") for the given wavelength service. The function used to calculate the WSMMI is based on a carrier profile—for example, a carrier might emphasize the SLA aspects when calculating the index.

The Revenue value, the CapEx value, the OpEx value, and the SLA value are derived from a combination of capturing photonic network operational and/or financial data (including, e.g., spare equipments) and analytics on the carrier's processes. The WSMMI enables the carrier to visualize monetization aspects of select (and/or all) of the wavelengths in the carrier's network in one compact form (e.g., using TreeMap). From the compact visualization, the carrier can pick a specific wavelength and can easily identify how many wavelength services are deployed on the specific wavelength and how many wavelength services are available for potential monetization on the specific wavelength.

The proposed techniques can be used to perform analytics on the carrier's network assets to present bottom-up opportunities and if defragmentation is needed, the carrier is presented with specific wavelengths and paths to assign to a wavelength service at a specific time.

The exemplary apparatuses and methods disclosed herein advantageously address the long-felt industry needs, as well as other previously unidentified needs, and mitigate shortcomings of the conventional methods and apparatus. For example, an advantage provided by the disclosed apparatuses and methods is that by using the WSMMI in combination with compact visualization of wavelength services, a carrier can easily identify which wavelength services are available in a network, which can then be proactively advertised as potential services. This enables the carrier to efficiently monetize their network. Further, compact visualization significantly reduces time and effort required to analyze the wavelength services that are available in a fragmented network, as well as identifies fragmented services and enables the carrier to identify possible defragmentation scenarios and a resultant revenue increase.

The exemplary apparatuses and methods disclosed herein can advantageously identify new routes available for a service with better service metrics for network re-optimization. Using the disclosed WSMMI techniques can also improve transmission capacity, accelerate launching new optical circuits, and provide for efficient future network use by minimizing future defragmentation of planned services.

Exemplary embodiments are disclosed in this application's text and drawings. Alternate embodiments can be devised without departing from the scope of the invention. Additionally, conventional elements of the current teachings may not be described in detail, or may be omitted, to avoid obscuring aspects of the current teachings.

As used herein, the term "exemplary" means "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections, as well as by using electromagnetic energy. The electromagnetic energy can have wavelengths in the radio frequency region, the microwave region, and/or the optical (both visible and invisible) region. These are several non-limiting and non-exhaustive examples.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

The terminology used herein is for the purpose of describing particular embodiments only and is not intended to be limiting. As used herein, the singular forms "a," "an," and "the" are intended to include the plural forms as well, unless the context clearly indicates otherwise. Further, the terms "comprises," "comprising," "includes," and "including," when used herein, specify a presence of stated features, integers, steps, operations, elements, and/or components, but do not preclude the presence and/or addition of one or more other features, integers, steps, operations, elements, components, and/or groups thereof.

As used herein, a wavelength service is, for example, an end-to-end private network that carries data via at least a fiber-optic channel. Also, the term EMS stands for element management system.

Description of the Figures

Figure 2:
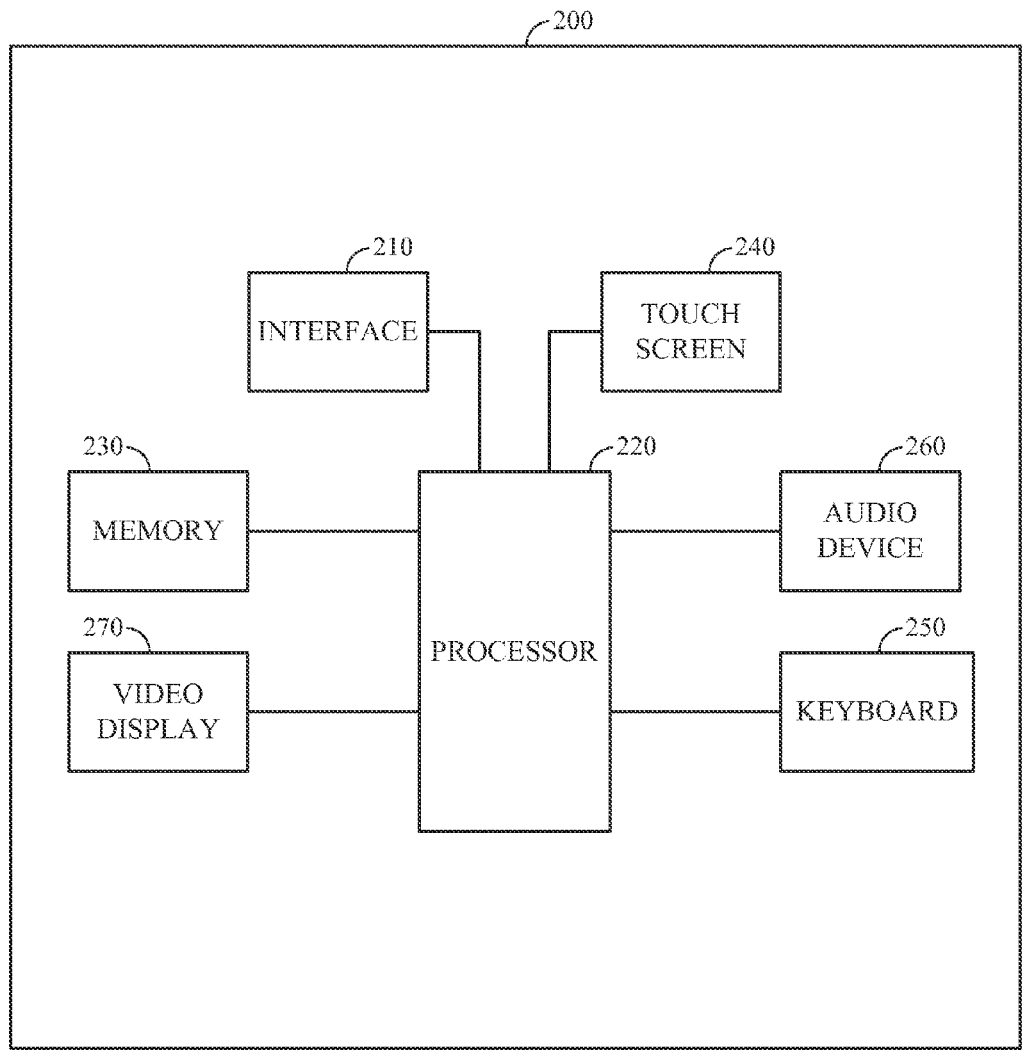
FIG. 2 depicts an exemplary schematic of a network management device.

FIG. 2 depicts an exemplary schematic of a network management device 200, such as an optical transport network (OTN) management system (NMS). The network management device 200 can include an interface 210 to electrically interface the network management device 200 to a computing device and/or a data transport network. The network management device 200 can also include a processor 220 coupled to a memory 230. In an example, at least a part of the processor 220 can be integrated on a semiconductor die.

The network management device 200 can include devices and circuitry to accept a user input, such as a touch screen 240, a keyboard 250, and/or an audio device 260 (e.g., a microphone). Further, the network management device 200 can also include devices and circuitry to provide output data, such as the touch screen 240, a video display 270, and/or the audio device 260 (e.g., a speaker). In examples, the memory 230, the interface 210, the video display 270, the touch screen 240, the audio device 260, and/or the keyboard 250 can be coupled therebetween and with the processor 220.

The interface 210 can enable the network management device 200 to communicate via a data transport network, such as to receive a wavelength service request having wavelength service requirements, to receive wavelength service data form a network element, to communicate optical layer operations, administration, maintenance, and provisioning (OAM&P) data to the management system 200, and the like. The interface 210 can include, for example, an Ethernet card (e.g., 10 BaseT, Fast Ethernet, Gigabit Ethernet, etc.) and/or a wireless local area network (WLAN) card (e.g., IEEE 802.11a/b/g/n). The interface 210 can include address, control, and/or data connections to enable appropriate communications.

The processor 220 is configured to perform at least a part of a method described herein, and can be configured as one or more integrated circuits, program instructions being executed by one or more integrated circuits, or by a combination of both to perform at least a part of a method for monetizing a carrier network. When the network management device 200 is operating, the processor 220 can be configured to execute program instructions stored within the memory 230; to control operations of the network management device 200 pursuant to the program instructions; and to communicate data to and from the memory 230, the interface 210, the video display 270, the touch screen 240, the audio device 260, and/or the keyboard 250.

The memory 230 can be used to store data, such as an analytic profile of the carrier's network, OAM&P data, and the like. The memory 230 can include volatile memory elements (e.g., random access memory (RAM, such as DRAM, SRAM, SDRAM, and the like)), nonvolatile memory elements (e.g., ROM, hard drive, flash drive, CD-ROM, and the like), and/or combinations thereof. Moreover, the memory 230 may incorporate electronic, magnetic, optical, and/or other types of storage media. The memory 230 can have a distributed architecture, where various constituent components are situated remotely from one another, and can be accessed by the processor 220.

Figure 3:
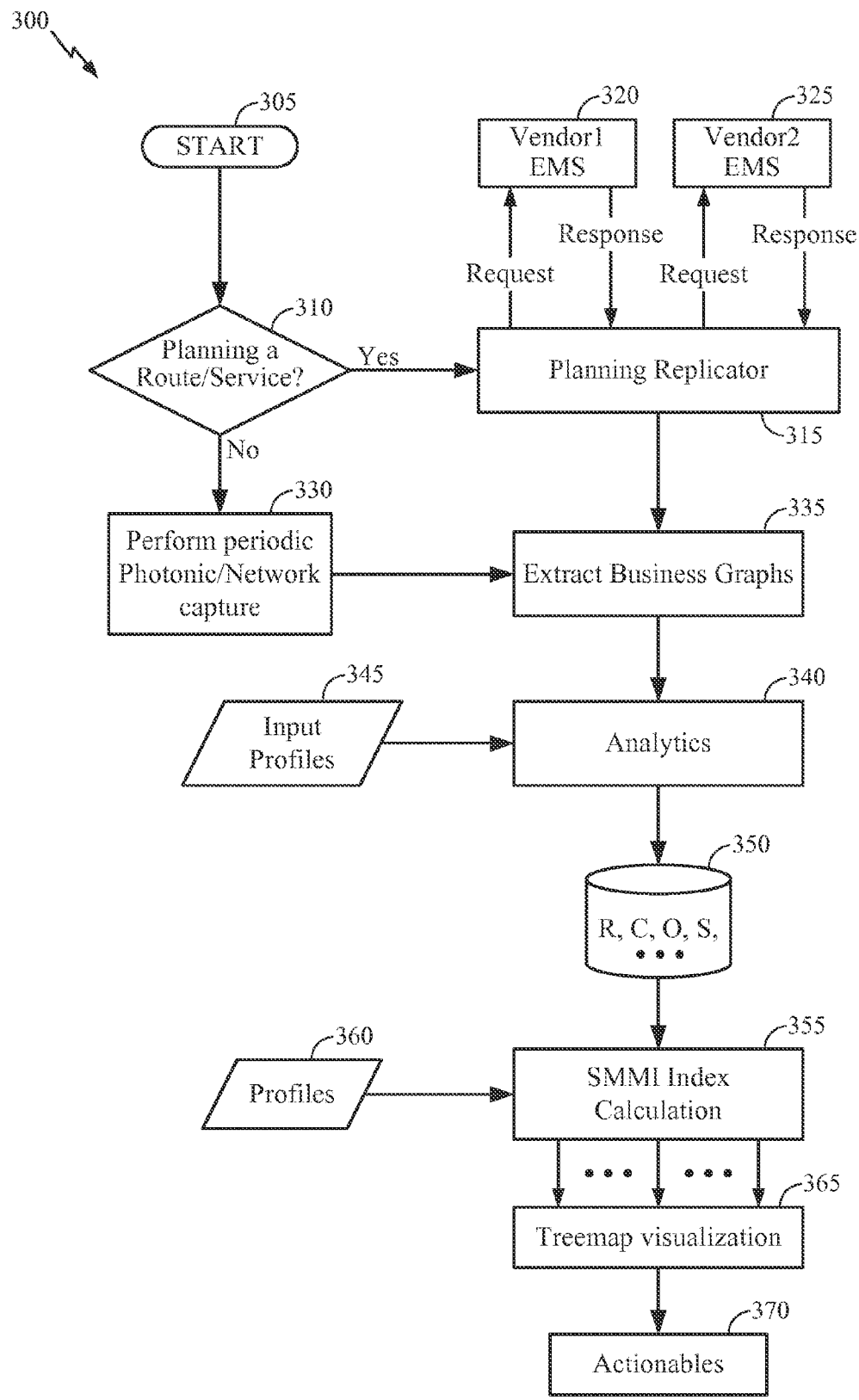
FIG. 3 depicts an exemplary method for monetizing a carrier network.

FIG. 3 depicts an exemplary method 300 for monetizing a carrier network. The method 300 starts at step 305.

In step 310, a decision is made as to whether a route and/or a wavelength service is being planned. If yes, then the method 300 proceeds to step 315. If no, then the method 300 proceeds to step 330.

At step 315, a planning replicator transparently routes the planning request from a carrier operations support systems (OSS) to multi-vendor EMSs (e.g., vendor one EMS 320 and vendor two EMS 325). The planning replicator can transparently pass through planning, inventory, provisioning, and maintenance processes interactions while capturing business intelligence for future analytics. The planning replicator also receives responses from the multi-vendor EMSs and, in step 335, stores the responses as a business process graph for future analysis, such as similarity searching and matching to determine which specific wavelengths and paths to assign to a wavelength service. Vertices on the business process graph can have attributes such as a reconfigurable optical add-drop multiplexer (ROADM), an intermediate line amplifier (ILA), a service termination and access point (LGX), and a splice. Attributes such as CapEx can also be captured. Edges on the business process graph can have attributes such as path length (e.g., 30 km) and fiber plant characteristics (e.g., loss, polarization mode dispersion, and the like).

Figure 4A:
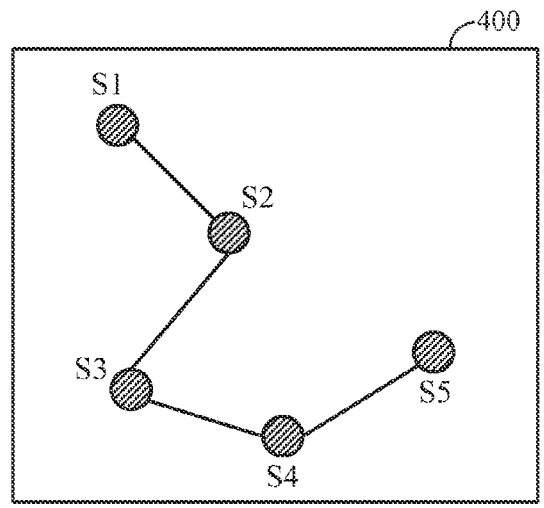
Figure 4B:
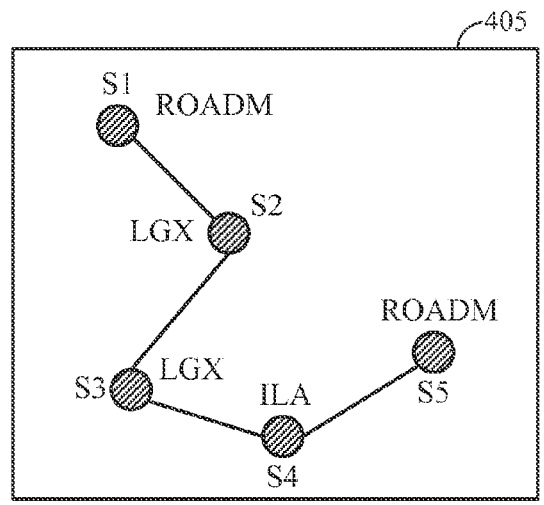
Figure 4C:
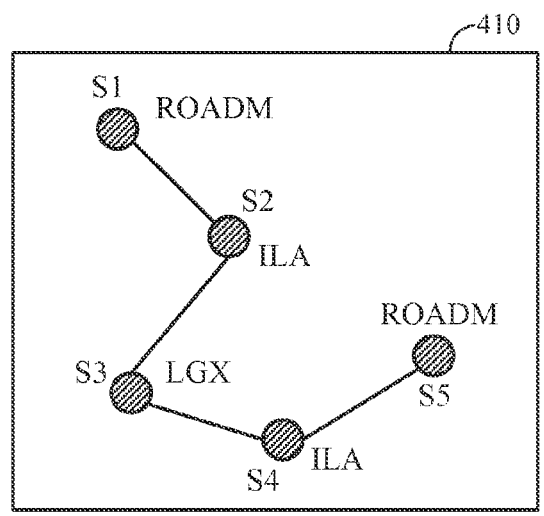

For example, if a carrier wants to plan a dense wavelength division multiplexing (DWDM) route via sites S1, S2, S3, S4, and S5, then the carrier OSS sends a planning request 400 to each of the multi-vendors for a competitive bid. FIG. 4A depicts the planning exemplary request 400. Each vendor replies with a response. The exemplary response 405 received from vendor one EMS 320 is depicted in FIG. 4B, and requires an ILA to be placed at site S4. The exemplary response 410 received from vendor two EMS 325 is depicted in FIG. 4C, and requires ILAs to be placed at sites S2 and S4. The planning replicator captures all of the requests and responses and stores them as attributed graph, such as those of FIGS. 4A-4C.

Returning to FIG. 3, at step 330, photonic network attributes of deployed network assets are captured. The inventory capture can occur periodically, to ensure that the captured photonic network attributes are regularly updated. The photonic network attributes are stored as an input to the business process graph in step 335. For example, some of the photonic network attributes that are captured can include source/destination locations (e.g., a Common Language Location Identifier (CLLI)), optional customer data, fiber characteristics (e.g., path latency), and supporting equipment information (e.g., a Ciena 40G OTS). Other data can also be captured. Table One shows an example of captured photonic network attributes that are relevant to revenue (R):

TABLE ONE

| Service | Source/Destination CLLI | Customer | Latency (µs) | Equipment |
|---|---|---|---|---|
| S1 | ALPHGA/ROSWGA | | 525 | Ciena 10G |
| S2 | ALPHGA/ROSWGA | | 788 | Ciena 10G |
| S3 | ATLAGAFD/ATLAGAXB | Trader | 30 | Ciena 100G |

In step 345, a profile is input to configure an analytic engine which performs analytics in step 340. An exemplary profile to assist in assigning a revenue (R) value is shown in Table Two:

TABLE TWO

| CLLI(s) | Customer | Latency Range (µs) | Equipment | Revenue Value Assignment |
|---|---|---|---|---|
| * | * | 500-530 | Ciena 10G | 0x02 |
| * | * | 500-530 | Ciena 40G | 0x0C |
| * | * | 500-530 | Ciena 100G | 0x24 |
| * | * | 0-100 | Ciena 100G | 0x80 |
| * | * | * | * | 0x01 |

"*" is the wildcard.

In the step 340, the analytic engine performs analytics on, for example, the vendor responses, the captured photonic network attributes, and the profile. The analytic engine first attempts to find an exact match of the service entry to the row in the profile. If no exact match is found, then a wildcard search is used to match. Once a match is found, the Revenue value (R) is assigned to the service and then persisted in the database in step 350. Using the example data of Table One and Table Two, the service S1 matches to the first row, hence the Revenue value (R) is assigned the value of 0x02. Further, the service S3 matches to the low latency entry in the profile and hence is assigned a Revenue value (R) of 0x80. Table Three shows the data being persisted:

TABLE THREE

| Service | Source/Destination CLLI | Customer | Latency | Equipment | R | C | O | S |
|---|---|---|---|---|---|---|---|---|
| S1 | ALPHGA/ROSWGA | | 525 | Ciena 10G | 0x02 | | | |
| S2 | ALPHGA/ROSWGA | | 788 | Ciena 10G | 0x01 | | | |
| S3 | ATLAGAFD/ATLAGAXB | Trader | 30 | Ciena 100G | 0x80 | | | |

Example columns are shown in Tables One, Two, and Three. A carrier can add more entries to the profile, for example entries describing other vendor equipment. The values for CapEx (C), OpEx (O), and SLA (S) can be similarly assigned based on profiles and stored in step 350. The columns (R), (C), (O), and (S) as depicted in Table Three are only an example and do not imply a required order. The data in Tables One, Two, and Three can also be depicted as a graph.

In step 355, the WSMMI is calculated by applying a function based on a profile ($F_{profile}$) 360 on the (R), (C), (O), and (S) values. In an exemplary implementation, each component of the index is assigned a logical value from $0_{HEX}$ to $FF_{HEX}$ (e.g., $20_{HEX}$, $30_{HEX}$, $80_{HEX}$, etc.). That is, a carrier maps absolute values into a logical range. A profile dictates a prioritized order in which to concatenate the R, C, O, and S values. For example, exemplary profiles might be integers with the following compositions of R, C, O and S to give unique values based on the carriers' preferences:

TABLE FOUR

| Bit: | MSB | | | LSB |
|---|---|---|---|---|
| $F_{profile\#1}$ = | R | C | O | S |
| $F_{profile\#2}$ = | R | O | C | S |
| $F_{profile\#3}$ = | S | R | C | O |

Once the (R), (C), (O), and (S) values are applied to a profile in the order dictated by the profile, the (R), (C), (O), and (S) values have been concatenated into a hexadecimal number, which can then be converted into a decimal number. Both the hexadecimal and decimal numbers are the WSMMI. The higher the value of the WSMMI, the more relatively valuable the respective wavelength service is to the carrier. All of the wavelength services on all the wavelengths in the network can have respective WSMMI values.

An exemplary calculation of WSMMI for a channel (e.g., Channel 23) can be as follows. In this case, the R, C, and O values are equal (e.g., $F_{profile}$(R, C, O, S)=f(20, 20, 20, 80)), so the carrier profile indicates that the carrier puts more emphasis on the SLA component. The higher SLA value indicates that, for example, this wavelength service must perform 99.99% of the time, or the carrier will incur liquidated damages. So, the WSMMI is a higher number, which can be depicted 365 in a Treemap visualization 415 as shown at the top in FIG. 4D and used as a basis for a decision (an "actionable") 370.

Another exemplary calculation of WSMMI is as follows. When R=$80_{HEX}$, C=$20_{HEX}$, O=$30_{HEX}$, and S=$80_{HEX}$, the resultant WSMMI calculation is:

WSMMI=$F_{profile}$(R,C,O,S)=f(80,20,30,80)= $80203080_{HEX}$=2149593216DECIMAL

Figure 4D:
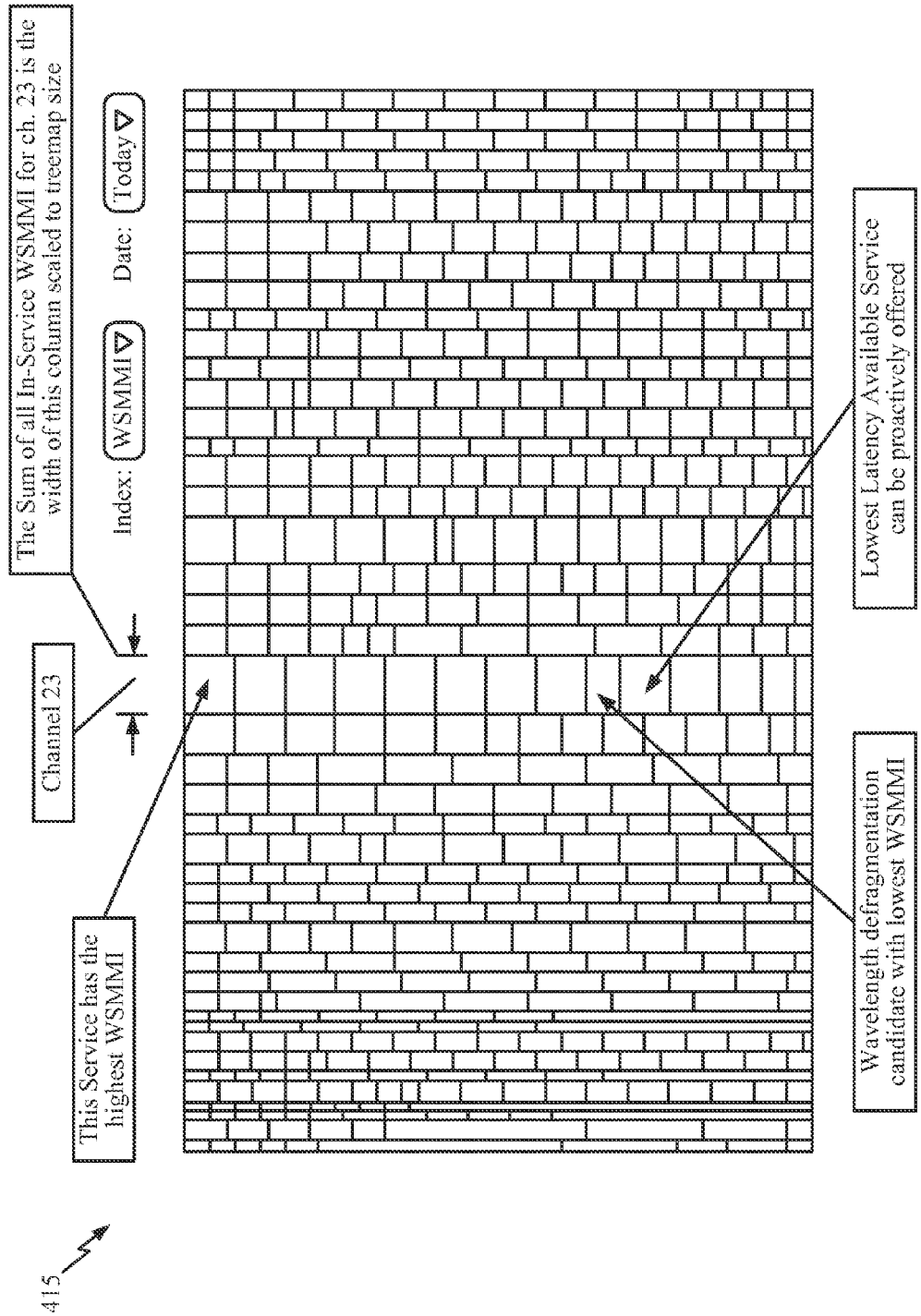

Another exemplary calculation of WSMMI using the same profile order ($F_{profile}$(R, C, O, S)) is as follows. When R=$80_{HEX}$, C=$20_{HEX}$, O=$30_{HEX}$, and S=$20_{HEX}$, the resultant WSMMI calculation is:

WSMMI=$F_{profile}$(R,C,O,S)=f(80,20,30,20)= $80203020_{HEX}$=2149593120$_{DECIMAL}$ Another exemplary calculation of WSMMI using a different profile order ($F_{profile}$(C, R, O, S)) is as follows. When R=$80_{HEX}$, C=$20_{HEX}$, O=$30_{HEX}$, and S=$20_{HEX}$, the resultant WSMMI calculation is:

WSMMI=$F_{profile}$(C,R,O,S)=f(20,80,30,20)= $20803020_{HEX}$=545271840$_{DECIMAL}$ By grouping wavelength services by the channel number, the visualization 415 shown in FIG. 4D can be used to display the network of existing wavelength services (the upper portion of the visualization 415) and potential available wavelength services (the lower portion of the visualization 415). The dimension on the x-axis of the visualization 415 is the respective sum of WSMMI for each channel. So at a glance, the carrier can see that channel 23 carriers most of the valuable wavelength services. That is the channel 23 slice has the biggest width. Within the channel 23 slice, the available wavelength services (the lower portion of the visualization) can be ordered by lowest latency. The available wavelength services can be proactively offered to potential customers immediately.

The existing services in the Treemap visualization are ordered by the highest WSMMI value by default. However, the carrier can choose different indexes from the index drop-down menu, and the Treemap visualization will display services that are sorted by the selected index, as depicted in the visualization 420 in FIG. 4E. The carrier can also select a future date. If planned services exist on that date, the Treemap visualization will show them with a distinct color and/or pattern, so that the carrier can explore future defragment opportunities in the future. That is, at that date, WSMMI values at the site proactively suggest to the carrier to perform defragmentation and/or to move services to other equipment (e.g., colorless equipment) for future OpEx reduction.

Figure 4F:
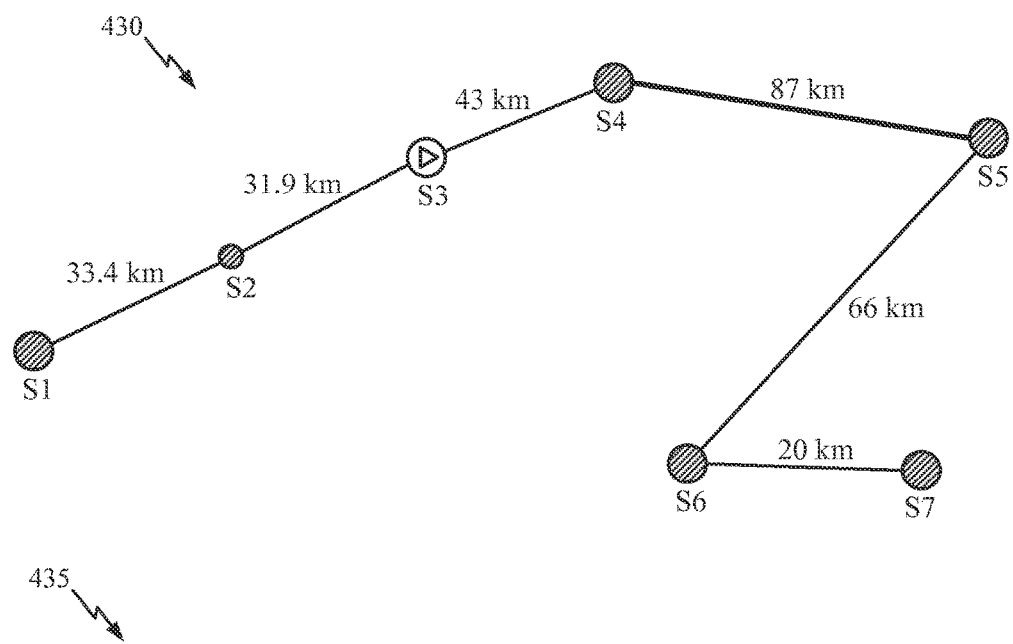
Figure 4G:
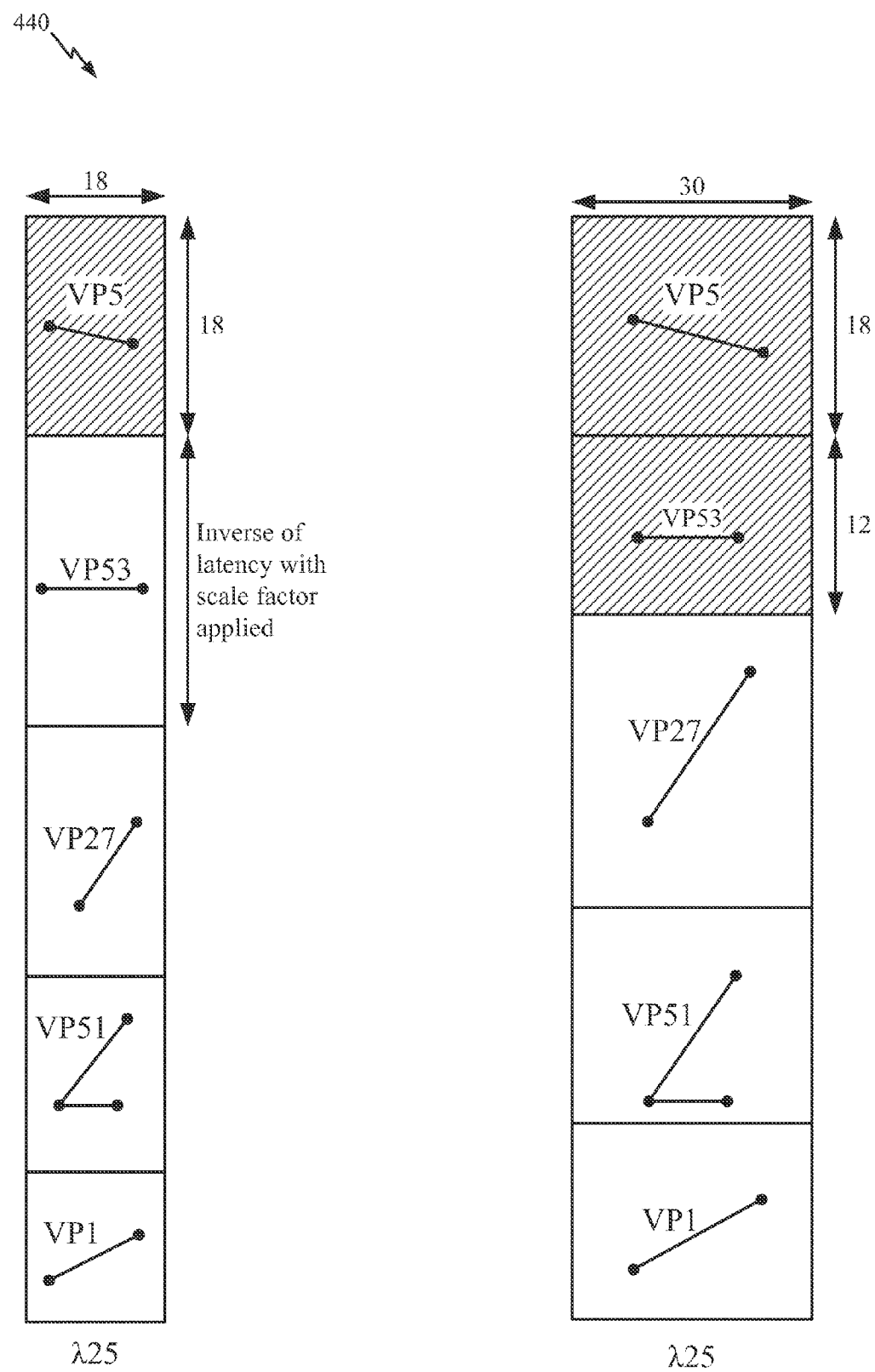

FIGS. 4F-4G depict a detailed example. FIG. 4F depicts a network 430 where a wavelength service on channel 25 is deployed between S4 and S5. There are four verification paths available for service on channel 25 as shown in the table 435 in FIG. 4F (VP1, VP27, VP51, and VP53).

FIG. 4G depicts the individual block 435 in the Treemap visualization that represents the wavelength service on channel 25. The left block in FIG. 4G shows only one wavelength service is deployed for channel 25. If a customer provisions the service on the verification path 53 (between S6 and S7), then the Treemap will be updated, and two used services and three available paths will be shown as in the right block in FIG. 4G. For example, the following WSMMI indexes are calculated:

WSMMI (for VP5)=18

WSMMI (for VP53)=12

The width of the column represents the sum of WSMMI values of existing wavelength services for given channel scaled by a width factor (for sake of simplicity, an absolute value of WSMMI is used in the figures). In this example, only one wavelength service on VP5 exists, and as a result the WSMMI value of that service (which is 18) determines the width of the whole column. As another service on VP53 (where WSMMI is 12) is deployed, the width increases to 30 (i.e. 12+18). The height of the rectangle for a wavelength service is also based on WSMMI, which takes a height scale factor into account, and the rectangles are ordered by highest WSMMI values. In the case that there exists lots of used wavelength services, the Treemap visualization will show only top services (e.g. the top five) and another rectangle containing the number of remaining wavelength services, so that the rectangle containing the number of remaining wavelength services can be expanded as a user hovers or clicks the rectangle containing the number of remaining wavelength services.

A list of available verification paths can be shown under used services and can be ordered by latency, since lower latency yields a potentially higher WSMMI index. The rectangles identifying available verification paths can also include a sparkline that represents a general shape of the path so that the complexity of a route can be recognized more easily.

Figure 5:
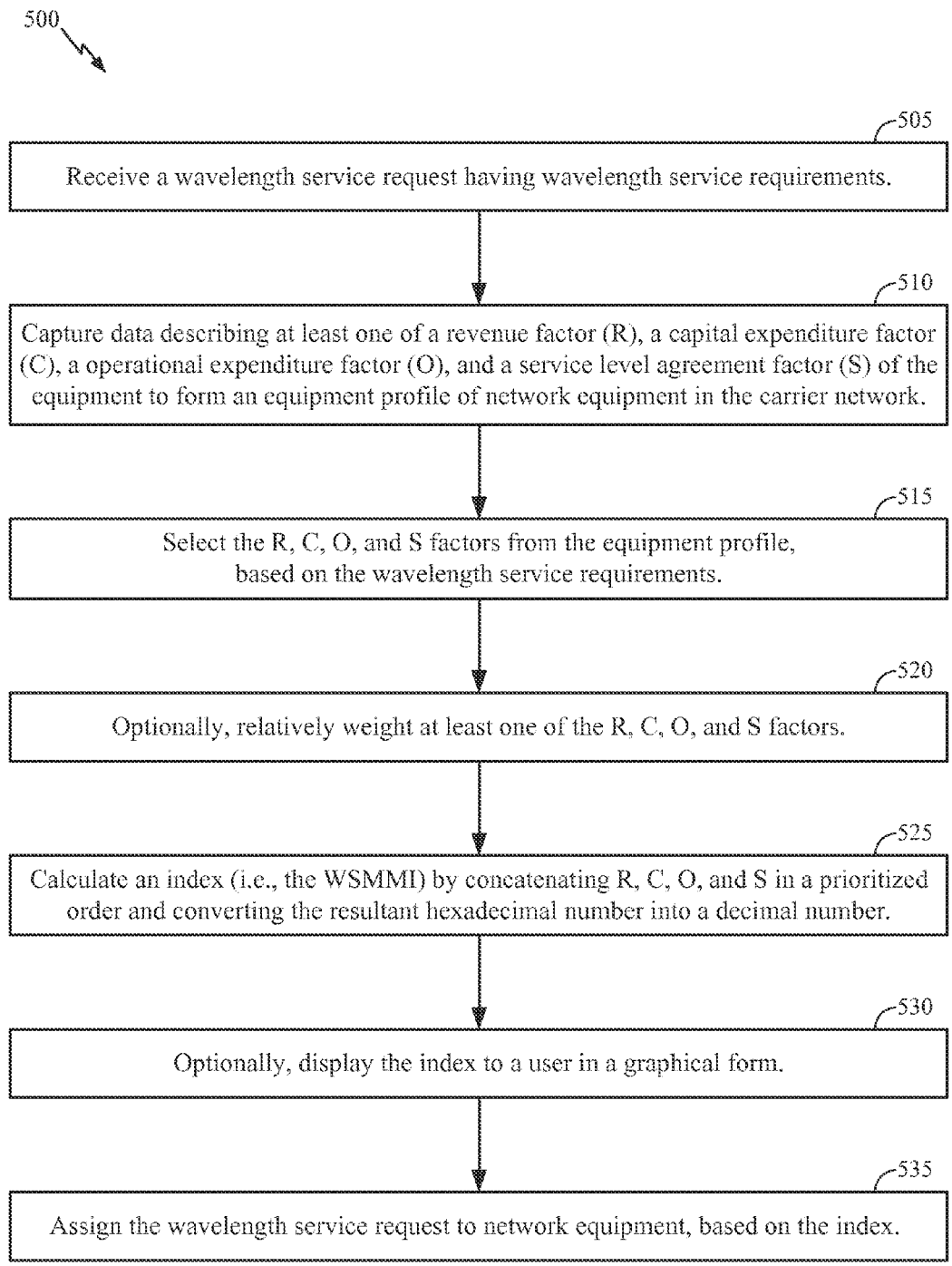
FIG. 5 also depicts an exemplary method that monetizes a carrier network.

FIG. 5 depicts an exemplary method for monetizing a carrier network 500. The method for monetizing a carrier network 500 can be performed by the apparatus described hereby, such as the network management device 200.

In step 505, data describing a wavelength service from deployed network assets is received (e.g., captured).

In optional step 510, data describing at least one of a revenue factor (R), a capital expenditure factor (C), an operational expenditure factor (O), and a service level agreement factor (S) of the equipment is captured to form an equipment profile of network equipment in the carrier network.

In step 515, the R, C, O, and S factors are selected from the equipment profile, based on the data received in step 505. The R, C, O, and S factors are hexadecimal numbers.

In optional step 520, at least one of the R, C, O, and S factors can be relatively weighted prior to performing step 520.

In step 525, an index (i.e., the WSMMI) is calculated by concatenating R, C, O, and S in a prioritized order and converting the resultant hexadecimal number into a decimal number.

In optional step 530, the index is displayed to a user in a graphical form.

In step 535, the index is assigned to the wavelength service.

Figure 6:
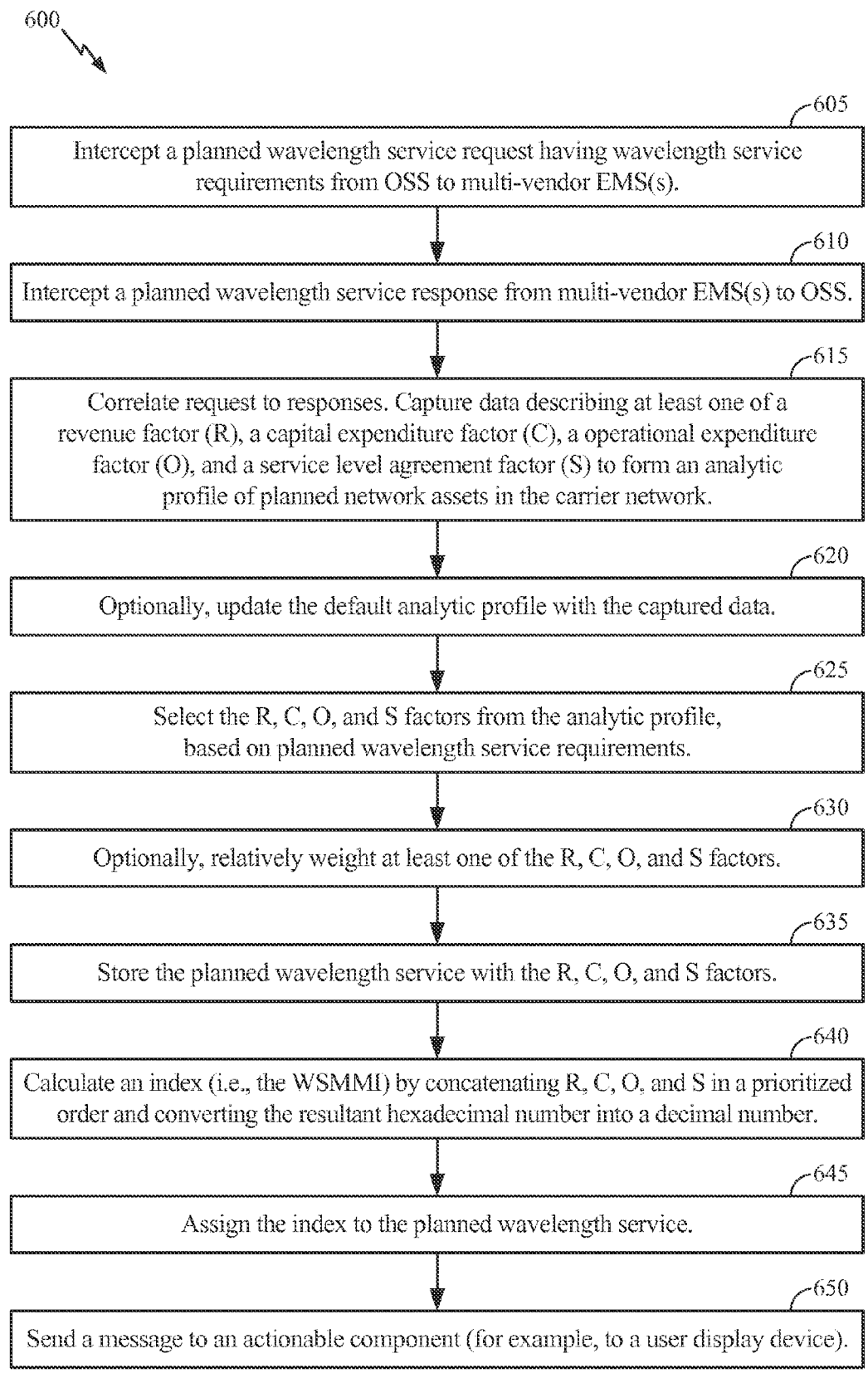
FIG. 6 depicts an exemplary method for monetizing a carrier network.

FIG. 6 depicts an exemplary method for monetizing a carrier network 600. The method for monetizing the carrier network 600 can be performed by the apparatus described hereby, such as the network management device 200.

In step 605, a planned wavelength service request having wavelength service requirements from OSS to multi-vendor EMS(s) is intercepted.

In step 610, a planned wavelength service response from multi-vendor EMS(s) to OSS is intercepted.

In step 615, the request is correlated to the response and data describing at least one of a revenue factor (R), a capital expenditure factor (C), an operational expenditure factor (O), and a service level agreement factor (S) are captured to form an analytic profile of planned network assets in the carrier network.

In step 620, optionally, the default analytic profile is updated with the captured data.

In step 625, the R, C, O, and S factors are selected from the analytic profile, based on planned wavelength service requirements.

In step 630, optionally, at least one of the R, C, O, and S factors are relatively weighted.

In step 635, the planned wavelength service request is stored with the R, C, O, and S factors.

In step 640, an index (i.e., the WSMMI) is calculated by concatenating R, C, O, and S in a prioritized order and converting the resultant hexadecimal number into a decimal number.

In step 645, the index is assigned to the planned wavelength service.

In step 650, a message is sent to an actionable component (for example, to a user display device).

Figure 7:
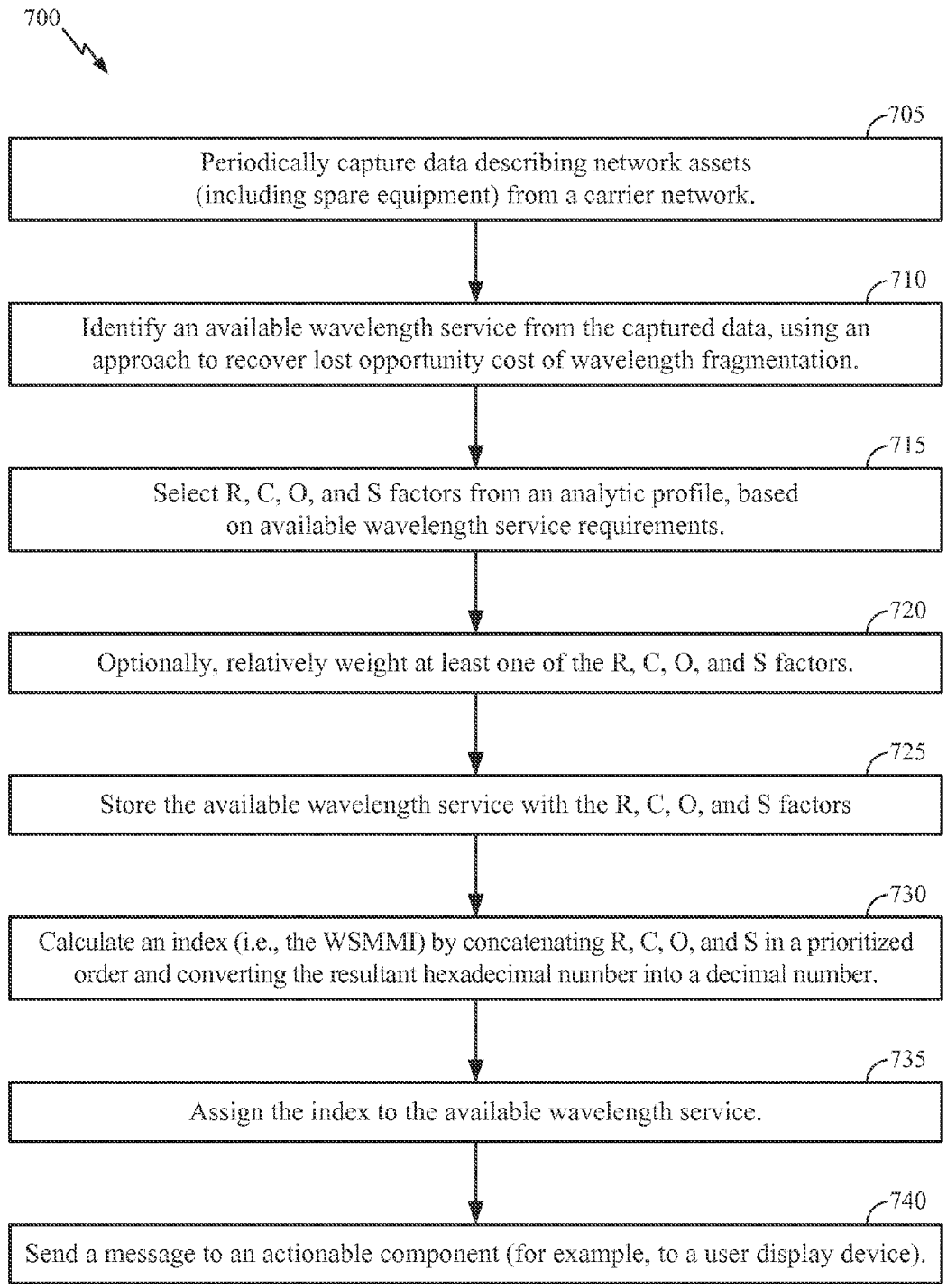
FIG. 7 depicts an exemplary method for monetizing a carrier network.

FIG. 7 depicts an exemplary method for monetizing a carrier network 700. The method for monetizing the carrier network 700 can be performed by the apparatus described hereby, such as the network management device 200.

In step 705, data describing a network asset (including spare equipment) is captured from a carrier network.

In step 710, an available (e.g., unused) wavelength service (e.g., a fragmented wavelength) is identified from the captured data. For example, an approach to recover lost opportunity cost of wavelength fragmentation is used.

In step 715, R, C, O, and S factors are selected from an analytic profile, based on available wavelength service requirements.

In step 720, optionally, at least one of the R, C, O, and S factors are relatively weighted.

In step 725, the available wavelength service is stored with the R, C, O, and S factors.

In step 730, an index (i.e., the WSMMI) is calculated by concatenating R, C, O, and S in a prioritized order and converting the resultant hexadecimal number into a decimal number.

In step 735, the index is assigned to the available wavelength service.

In step 740, a message is sent to an actionable component (for example, to a user display device).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

At least a portion of the methods, sequences and/or algorithms described in connection with the embodiments disclosed herein may be embodied directly in hardware, in a software module executed by a processor, or in a combination of the two. In an example, a processor includes multiple discrete hardware components. A software module may reside in RAM memory, flash memory, ROM memory, EPROM memory, EEPROM memory, registers, hard disk, a removable disk, a CD-ROM, and/or any other form of storage medium known in the art. An exemplary storage medium can be coupled to the processor such that the processor can read information from, and write information to, the storage medium. In an alternative, the storage medium may be integral with the processor.

Further, many embodiments are described in terms of sequences of actions to be performed by, for example, elements of a computing device. Various actions described herein can be performed by a specific circuit (e.g., an application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, a corresponding circuit of any such embodiments may be described herein as, for example, "logic configured to" perform a described action.

An embodiment of the invention can include a computer readable media embodying a method described herein. Accordingly, the invention is not limited to illustrated examples and any means for performing the functionality described herein are included in embodiments of the invention.

The disclosed devices and methods can be designed and can be configured into a computer-executable file that is in a Graphic Database System Two (GDSII) compatible format, an Open Artwork System Interchange Standard (OASIS) compatible format, and/or a GERBER (e.g., RS-274D, RS-274X, etc.) compatible format, which are stored on a non-transitory (i.e., a non-transient) computer-readable media. The file can be provided to a fabrication handler who fabricates with a lithographic device, based on the file, an integrated device. In an example, the integrated device is on a semiconductor wafer. The semiconductor wafer can be cut into a semiconductor die and packaged into a semiconductor chip. The semiconductor chip can be employed in a device described herein (e.g., a mobile device).

Embodiments can include a non-transitory (i.e., a non-transient) machine-readable media and/or a non-transitory (i.e., a non-transient) computer-readable media embodying instructions which, when executed by a processor, transform a processor and any other cooperating devices into a machine configured to perform at least a part of a function described hereby and/or transform a processor and any other cooperating devices into at least a part of the apparatus described hereby.

Nothing stated or illustrated herein is intended to cause a dedication of any component, step, feature, object, benefit, advantage, or equivalent to the public, regardless of whether the component, step, feature, object, benefit, advantage, or the equivalent is recited in the claims.

While this disclosure describes exemplary embodiments of the invention, it should be noted that various changes and modifications could be made herein without departing from the scope of the invention as defined by the appended claims.

What is claimed is:

1. A method for configuring a carrier optical network, implemented in a management system comprising a processor, comprising:
receiving data describing wavelength services from deployed network equipment comprising the carrier optical network with network elements providing the wavelength services, wherein each network element is configured to communicate optical layer operations, administration, maintenance, and provisioning (OAM&P) data from the network equipment to the management system, and wherein the data is received from an element management system associated with one of a plurality of vendors of the network elements;
responsive to a request for a wavelength service, selecting a revenue factor (R), a capital expenditure factor (C), an operational expenditure factor (O), and a service level agreement factor (S) from an equipment profile of the network equipment in the carrier optical network based on the OAM&P data, wherein R, C, O, and S are numbers obtained by converting OAM&P data values and are used to describe the network elements for the plurality of vendors of the network elements;
calculating an index by concatenating R, C, O, and S in a prioritized order and converting the number into a decimal number;
assigning the index to the wavelength service; and
assigning the wavelength service to the network elements based on the index such that the R, C, O, and S for the wavelength service is achieved and deploying a wavelength based on the assigning through the network elements to provide the wavelength service.

2. The method of claim 1, further comprising relatively weighting at least one of R, C, O, and S prior to performing the calculating.

3. The method of claim 1, further comprising using a default analytic profile in the selecting the R, C, O, and S factors.

4. The method of claim 1, further comprising displaying the index to a user in a graphical form.

5. An apparatus for configuring a carrier optical network, comprising
a processor configured to:
receive data describing wavelength services from deployed network equipment comprising the carrier optical network with network elements providing the wavelength services, wherein each network element is configured to communicate optical layer operations, administration, maintenance, and provisioning (OAM&P) data from the network equipment to a management system, and wherein the data is received from an element management system associated with one of a plurality of vendors of the network elements;
responsive to a request for a wavelength service, select a revenue factor (R), a capital expenditure factor (C), an operational expenditure factor (O), and a service level agreement factor (S) from an equipment profile of the network equipment in the carrier optical network based on the OAM&P data, wherein R, C, O, and S are numbers obtained by converting OAM&P data values and are used to describe the network elements for the plurality of vendors of the network elements;
calculate an index by concatenating R, C, O, and S in a prioritized order and converting the number into a decimal number;
assign the index to the wavelength service; and
assign the wavelength service to the network elements based on the index such that the R, C, O, and S for the wavelength service is achieved and a wavelength is deployed accordingly through the network elements to provide the wavelength service.

6. The apparatus of claim 5, wherein the processor is further configured to relatively weight at least one of R, C, O, and S prior to performing the calculating.

7. The apparatus of claim 5, wherein the processor is further configured to use a default analytic profile in the selecting the R, C, O, and S factors.

8. The apparatus of claim 5, wherein the processor is further configured to display the index to a user in a graphical form.

9. A non-transitory computer-readable medium, comprising instructions stored thereon that, if executed by a processor, cause the processor to execute a method, implemented in a management system, comprising:
receiving data describing wavelength services from deployed network equipment comprising a carrier optical network with network elements providing the wavelength services, wherein each network element is configured to communicate optical layer operations, administration, maintenance, and provisioning (OAM&P) data from the network equipment to the management system, and wherein the data is received from an element management system associated with one of a plurality of vendors of the network elements;
responsive to a request for a wavelength service, selecting a revenue factor (R), a capital expenditure factor (C), an operational expenditure factor (O), and a service level agreement factor (S) from an equipment profile of the network equipment in the carrier optical network based on the OAM&P data, wherein R, C, O, and S are numbers obtained by converting OAM&P data values and are used to describe the network elements for the plurality of vendors of the network elements;

calculating an index by concatenating R, C, O, and S in a prioritized order and converting the number into a decimal number;

assigning the index to the wavelength service; and assigning the wavelength service to the network elements based on the index such that the R, C, O, and S for the wavelength service is achieved and deploying a wavelength based on the assigning through the network elements to provide the wavelength service.

10. The non-transitory computer-readable medium of claim 9, wherein the method further comprises relatively weighting at least one of R, C, O, and S prior to performing the calculating.

11. The non-transitory computer-readable medium of claim 9, wherein the method further comprises using a default analytic profile in the selecting the R, C, O, and S factors.

12. The non-transitory computer-readable medium of claim 9, wherein the method further comprises displaying the index to a user in a graphical form.

13. A carrier optical network, comprising:
a plurality of interconnected sites configured to support one or more wavelength services from deployed network equipment; and
a processor communicatively coupled to the deployed network equipment and configured to:
receive data describing the wavelength services from the deployed network equipment comprising the carrier optical network with network elements providing the wavelength services, wherein each network element is configured to communicate optical layer operations, administration, maintenance, and provisioning (OAM&P) data from the network equipment to a management system, and wherein the data is received from an element management system associated with one of a plurality of vendors of the network elements;

responsive to a request for a wavelength service, select a revenue factor (R), a capital expenditure factor (C), an operational expenditure factor (O), and a service level agreement factor (S) from an equipment profile of the network equipment in the carrier optical network based on the OAM&P data, wherein R, C, O, and S are numbers obtained by converting OAM&P data values and are used to describe the network elements for the plurality of vendors of the network elements;

calculate an index by concatenating R, C, O, and S in a prioritized order and converting the number into a decimal number;

assign the index to the wavelength service; and assign the wavelength service to the network elements based on the index such that the R, C, O, and S for the wavelength service is achieved and a wavelength is deployed accordingly through the network elements to provide the wavelength service.

14. The carrier optical network of claim 13, wherein the processor is further configured to relatively weight at least one of R, C, O, and S prior to calculation of the index.

15. The carrier optical network of claim 13, wherein the processor is further configured to use a default analytic profile in the selecting the R, C, O, and S factors.

16. The carrier optical network of claim 13, wherein the processor is further configured to display the index to a user in a graphical form.

* * * * *